United States Patent [19]

Collins et al.

[11] Patent Number: 4,900,488

[45] Date of Patent: Feb. 13, 1990

[54] METHOD OF MANUFACTURING A SYNTACTIC SLEEVE FOR INSULATING A PIPELINE

[75] Inventors: Michael H. Collins; Alan R. Lyle, both of Chester, England

[73] Assignee: Shell Oil Company, Houston, Tex.

[21] Appl. No.: 247,189

[22] Filed: Sep. 21, 1988

[30] Foreign Application Priority Data

Sep. 25, 1987 [GB] United Kingdom ............... 8722605

[51] Int. Cl.$^4$ .................... B29C 41/04; B29C 67/20
[52] U.S. Cl. ............................... 264/45.7; 264/311; 264/DIG. 6
[58] Field of Search ............ 264/45.7, DIG. 6, 310, 264/311

[56] References Cited

U.S. PATENT DOCUMENTS

| 3,764,247 | 10/1973 | Garrett et al. ............... 264/DIG. 6 |
| 3,856,721 | 12/1974 | Fritschel ..................... 264/DIG. 6 |
| 3,996,654 | 12/1976 | Johnson ....................... 264/DIG. 6 |
| 4,637,907 | 1/1987  | Hegel et al. ................. 264/DIG. 6 |

FOREIGN PATENT DOCUMENTS

| 151461  | 8/1985 | European Pat. Off. ...... 264/DIG. 6 |
| 952538  | 3/1964 | United Kingdom . |
| 1380262 | 1/1975 | United Kingdom . |
| 2130138 | 5/1984 | United Kingdom . |

Primary Examiner—Thurlow Jeffery
Assistant Examiner—Leo B. Tentoni

[57] ABSTRACT

A spincasting technique for forming a syntactic insulation layer around a pipeline includes rotating a drum while or after injecting components for forming syntactic insulation material into said drum. In this manner a syntactic material is formed in which larger, low density, microspheres are biased towards the inner surface of the insulation layer.

8 Claims, 1 Drawing Sheet

METHOD OF MANUFACTURING A SYNTACTIC SLEEVE FOR INSULATING A PIPELINE

BACKGROUND OF THE INVENTION

1. Field of the Invention

The invention relates to a method for manufacturing a syntactic sleeve for insulating a pipeline.

2. Description of the Prior Art

Syntactic materials consist of a polymeric matrix material in which hollow glass or other microspheres of different sizes and densities are embedded. A number of the physical properties of syntactic materials appear to be dependent on the size and distribution of the microspheres in the matrix material. For example the heat insulation coefficient of the syntactic material increases with an increasing content of microspheres whereas the mechanical stress at failure of the syntactic material decreases with an increasing content of microspheres.

Syntactic materials are particularly suitable for insulating subsea pipelines for transport of oil and gas in view of their high creep resistance in comparison to other heat insulating materials such as formed polymers. However, the mechanical loads exerted to the insulation material during pipelaying operations are extremely high, and the mechanical strength thus required leads to a low microsphere content which again leads to a low heat insulation coefficient and the requirement of thick insulation layer.

The presence of a thick insulation layer is of particular concern during pipelaying operations which are usually carried out by a reel large or J-lay installation technique during which the pipe is subject to extremely high bending and tension forces since an increased thickness leads to a corresponding increase of elongation and compression at the outer circumference of the insulating layer and an increased risk of formation of cracks in the insulation material.

Thus there still is a need for an improved syntactic pipeline insulation system which has a high heat insulation coefficient and which has simultaneously a high ductility, in particular near the outer circumference of the insulation layer.

It is therefore an object of the present invention to provide a method for manufacturing a syntactic insulation layer around a pipeline which meets the above need.

SUMMARY OF THE INVENTION

The method according to the invention comprises the steps of providing a drum having a generally cylindrical shape, injecting into said drum components for forming a syntactic insulation material containing microspheres of different densities, rotating the drum about the central longitudinal axis thereof, thereby inducing said components to form an annular layer alongside the inner wall of the drum and simultaneously creating a concentration of microspheres having a comparatively low density in an area near the inner surface of said annular layer, and allowing said components to cure to a sleeve of syntactic material.

The sleeve of syntactic material may be manufactured directly around the pipeline by arranging the drum co-axially around a section of the pipeline and rotating them simultaneously while or after injecting said components for forming the syntactic material into the drum. Alternatively the sleeve of syntactic material may, after manufacturing thereof, be slid around and bonded to the pipeline to be insulated. (General spin casting techniques for constant density fillers are discussed in Great Britain Patent application No. 2,130,138A).

The present invention is based on the insight that microspheres having a comparative large size generally have a comparatively small density both in comparison to the density of the matrix material and to the density of small size microspheres, and that by a spincasting technique migration of large size microspheres towards an area close to the pipe wall can be achieved. In this manner an insulation layer is created which has in a radial direction from the pipe wall towards the sleeve a decreasing heat insulation coefficient and an increasing ductility. Thus, without sacrificing insulation properties the insulation layer has become more suitable to withstand bending forces during pipelaying operations and hydrostatic forces during the operation at large waterdepths.

The invention will now be explained in more detail with reference to the accompanying drawing which shows the gradation of microspheres in a syntactic insulation layer manufactured by the method according to the invention.

IN THE DRAWING

FIG. 1 shows a longitudinal sectional view of a syntactic insulation layer.

DETAILED DESCRIPTION

Figure 1:
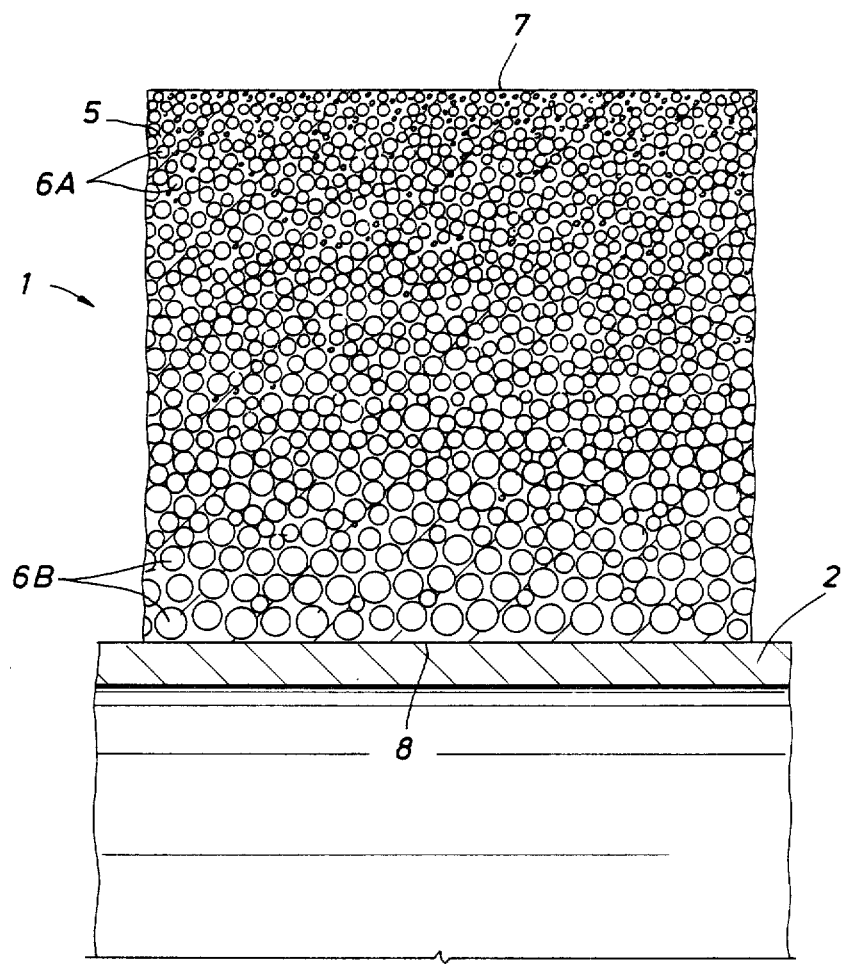

Referring now to FIG. 1, the layer 1, is shown located around a steel pipeline 2. The layer 1 consists of a polymeric matrix material 5 in which hollow glass microspheres 6A, 6B are embedded. As can be seen in the drawing the smaller, high density microspheres 6A are generally biased towards the outer surface 7 of the insulation layer 1, whereas the larger less dense microspheres 6B are generally biased towards the inner surface 8 of the insulation layer 1, near the pipe wall 2. Said segregation is accomplished by manufacturing the insulation layer 1 by the spin casting method according to the invention.

During a first step of the process a cylindrically shaped drum (not shown) is arranged co-axially around a section of the pipe 2 such that an annular space of continuous width is created therebetween. Subsequently components for forming the syntactic material are fed into the annular space and, before, simultaneously with, or subsequently to said feeding, the drum and pipe section 2 are rotated about the longitudinal axis of the pipe section 2 so as to obtain segregation in radial direction of the microspheres as a function of density. In this manner the smaller dense microspheres 6A tend to migrate towards the outer surface 7 of the insulation layer 1 whereas the light microspheres 6B tend to migrate towards the inner surface 8 of the insulation layer 1. Finally said components are allowed to cure to a syntactic material. During said final step the rotation of the pipe section 2 and drum may be continued, if desired.

In the above manner a syntactic layer is created which has a high heat insulation coefficient near the inner surface thereof and a high ductility near the outer surface thereof. Moreover, the formation of voids in the syntactic material is reduced.

Suitable resins for use as a component for forming the syntactic material are polyester and epoxy resins. Suitable microspheres are glass microspheres type B 37/2000 manufactured by the 3M Company. Other syntactic foam mixtures well known to the art are included in U.S. Pat. No. 3,856,721.

As discussed above the resin and microspheres may be premixed and then fed into the annular space. It is preferred however to feed the resin and microspheres separately into the annular space and allow them to mix in-situ. Apart from eliminating a stage in the manufacturing process this has the advantage that it allows the use of low strength microspheres since the forces on them, during mixing with the matrix material, are much lower than in conventional mixing processes.

It will be understood that instead of spincasting the syntactic sleeve directly around the pipeline as discussed above, the sleeve may also be spincast separately from the pipeline to be insulated.

It will further be understood that a protective skin of polymeric material may be fabricated around the pipeline to be insulated. This could be accomplished by first injecting a resin for forming the skin and subsequently injecting the components for forming the syntactic sleeve into the rotating drum.

Preferably the protective skin is made of the same material as the matrix material of the syntactic sleeve. If desired, the protective skin may be reinforced by glass or other fibres which are tangentially or helically wound in order to create a skin having a high hoop strength and a high axial ductility. The protective skin could also be made separately from the syntactic sleeve whereupon the syntactic sleeve is spincast within the protective skin. In that case the prefabricated protective skin could form the drum in which the syntactic sleeve is manufactured.

The method according to the invention may be utilized for manufacturing an insulation layer around any type of pipeline. The method is particularly suitable for manufacturing an insulation layer around subsea pipelines because these are subject to high bending forces during pipelaying operations and high compressive forces are exerted to the insulation layer by hydrostatic forces which requires an insulation layer which has in particular near the outer surface thereof a high ductility and mechanical strength. The method according to the invention may be carried out to create onshore an insulation layer around individual pipe sections which sections are subsequently transported to a pipelaying vessel which the pipe sections are welded together to an elongate pipeline. At the locations of the welds the gap between syntactic layers of adjacent pipe sections may be filled by half shells made of syntactic material which shells are held together by an overwrap.

We claim:

1. A method for manufacturing a syntactic sleeve for insulating a pipeline, said method comprising the steps of:

providing a drum having a generally cylindrical shape, injecting into said drum components for forming a syntactic insulation material containing microspheres of different densities, rotating the drum about a central longitudinal axis thereof, thereby inducing said components to form an annular layer alongside an inner wall of the drum and simultaneously creating a concentration of microspheres having a comparatively low density in an area near an inner surface of said annular layer, and a concentration of microspheres having a comparatively high density in an area near an outer surface of said annular layer, the comparative density of said microspheres varying from said inner surface to said outer surface of said annular layer, and allowing said components to cure to a sleeve of syntactic material.

2. The method of claim 1, wherein the step of injecting said components is at least partly simultaneously carried out with the step of rotating the drum.

3. The method of claim 1, wherein said components for forming the syntactic material consist of hollow glass microspheres and a resin for forming a polymeric matrix material.

4. The method of claim 3, wherein said resin and microspheres are mixed with each other prior to injecting them into said drum.

5. The method of claim 3, wherein said resin and microspheres are injected into said drum via separate feeds.

6. The method of claim 1, further comprising the steps of arranging co-axially within said drum a section of the pipeline to be insulated such than an annular space is created therebetween, injecting said components into said annular space and rotating the drum and pipeline section simultaneously about the central longitudinal axis of the drum.

7. The method of claim 1, wherein the sleeve is manufactured such that an internal diameter thereof corresponds to an outer diameter of the pipeline to be insulated and is after manufacturing thereof slid around the pipeline and bonded thereto.

8. The method of claim 2, wherein prior to injecting said components for forming the syntactic material into the drum a resin for forming a protective polymer skin is injected into the drum while rotating the drum.

* * * * *